INVENTORS:
FREDERICK K. MESEK
VIRGINIA REPKE
BY
Nicholas A. Gallo, III
ATTORNEY.

United States Patent Office 3,452,877
Patented July 1, 1969

---

3,452,877
FILTER MEDIA
Frederick K. Mesek, Downers Grove, and Virginia Repke, Worth, Ill., assignors to Johnson & Johnson, a corporation of New Jersey
Filed Apr. 17, 1967, Ser. No. 631,403
Int. Cl. B01d 25/00, 39/02
U.S. Cl. 210—491          6 Claims

ABSTRACT OF THE DISCLOSURE

Layered filter media are disclosed which utilize as the initial filter zone on the inlet side of the filter media a web having a surface pore size of well in excess of 1,000 microns, the web being formed of relatively rigid fibers which are not softened by the solution being filtered and which have a denier of from about 25 to about 60. These media are particularly useful for the filtration of cellulose acetate solutions and when used for such, exhibit improved filter life over filters heretofore used.

BACKGROUND OF THE INVENTION

In the spinning of filaments from high polymeric materials such as, for example, cellophane, viscose rayon, cuprammonium rayon, cellulose esters such as cellulose acetate and triacetate, and acrylic fibers such as, for example, those sold under the trade names "Acrilan" and "Creslan," etc., it is essential that the spinning solution be substantially free of solid and semisolid particles and that it have a uniform consistency. Otherwise, the orifices in the spinnerette through which the solution is passed quickly become partially or completely blocked, thus disrupting operations or, at best, providing barely operating conditions which yield defective, non-uniform and unsatisfactory filaments. Additionally, even if such solid and semisolid particles manage to get through the spinnerette, their presence in the final product exerts an undesirable, weakening effect. This weakening caused by the presence of foreign bodies is primarily a problem for low denier filaments, particularly for those having a diameter of from about 3 microns to about 75 microns and for thin cellophane sheets and films such as those having a thickness range of from about .0005 inch to about .01 inch.

It has heretofore been proposed, for example, in Thomas Patent 3,003,643, to use in the filtration of such solutions, zoned filters, that is, filters made up of several zones of varying pore size in order to trap particles of varying size that may be contained in the solution being filtered. Pore, as the term is used herein, is a fluid conducting passage passing completely through the filter zone. "Maximum pore size" is the largest cross sectional passage and is determined by the smallest cross sectional area of such passage since it is the smallest cross sectional area of any passage that determines the actual fluid flow therethrough. "Maximum surface pore size" is the smallest surface adjacent cross sectional area of any such passage and is determined by the maximum pore size of a 1 ounce per square yard layer of said zone. The pore diameter measurements referred to herein and called "maximum pore size" are determined under a compacting pressure of 30 p.s.i. by the standard tests set forth in the Journal of the Textile Institute, May 1954 on pages T371 through T389.

In Thomas Patent 3,003,643, a filter is described having an initial filter zone with a maximum pore size within the range of about 175 to about 300 microns and a maximum surface pore size of up to 300 microns to filter out larger particles and skins, followed by one or more filter zones of substantially smaller pore size to take out the smaller particles, the maximum pore size generally being in the range of from about 55 to 160 microns. The skins referred to are coagulated film flakes that tend to form in the processing equipment and must be removed along with any other particles present. These filters, which are usually made of cotton, may contain several layers of varying pore size, the particular pore size used depending upon the particular solution being filtered. The pore sizes, however, generally fall within the ranges indicated above.

While filters made up of zones of varying pore size within the above limits were quite satisfactory in the removal of undesirable particles from solutions, there was still much to be desired as far as improving the life of the filter, that is, the number of gallons of solution which can be passed through the filter before it becomes so plugged that it is no longer satisfactorily operable. An examination of these filters after use to failure showed that the primary point of breakdown of the filter was in the initial filter zone. The surface pores of the initial filter zone became so plugged that it substantially restricted the flow of the solution on through to the remainder of the filter. The filter failure is not an abrupt stoppage of the flow of the solution through the filter, but a gradual build-up with increasing pressures required to force the solution through the filter to the point where the resistance of the filter is such that it is no longer satisfactory.

It was then discovered, and disclosed in Patent 3,276,-597 to Mesek, that the above difficulties could be obviated in the case of viscose filtration if there is placed on the inlet side of the filter media prior to the filter zone of relatively small pore size, a filter layer formed of springy, relatively rigid or stiff fibers, which do not lose their springy characteristics when thoroughly and continuously wetted by immersion in the viscose solution being filtered during the life of the filter media, having a denier of between 5 and 24. Thus, the initial zone had a maximum surface pore size of from about 500 to about 1,000 microns, or substantially greater than the maximum surface pore size range of about 300 microns theretofore provided in the initial filter zone. This was indeed surprising when it is considered that such an increase in pore size would normally be expected to allow a substantially greater amount of particles and skins of larger size to pass on through to the following filter layer or layers of substantially smaller pore size with the result that these layers would in turn become blocked more rapidly with no appreciable increase in the overall life of the filter media.

However, the provision of an initial filter zone of increased maximum surface pore size by virtue of the use of fibers having a denier of from 5 to 24 did not increase significantly filter life when the filter was used for cellulose acetate filtration. It was anticipated that this was due to the fact that in cellulose acetate solutions, the skin-like particles are thought to be somewhat smaller than those in viscose solutions and that therefore the particles simply passed through the initial filter zone of large pore size and plugged the second zone of smaller pore size. Therefore, the search for a filter with longer life for cellulose acetate filtration continued.

THE INVENTION

It has now been surprisingly found that filter life in cellulose acetate filtration can be substantially lengthened if the initial filter zone comprises an outer layer having a bed weight of no less than about 1.0 ounce per square yard of springy, relatively rigid nonsoftening fibers having a denier well above 25 and preferably of from about 35 or 40 to about 60 to thus form surface pores considerably in excess of the upper limit of 1,000 microns disclosed in the earlier referred to Mesek patent, and if where the outer layer has a bed weight of substantially less than about 8 ounces per square yard, the initial filter zone also comprises an inner layer having a bed weight of no less than about 1.0 ounce per square yard of relatively rigid springy nonsoftening fibers having a denier of from about 5 to about 24 and having a surface pore size of from about 500 to about 1,000 microns.

Apparently the filtration mechanism of cellulose acetate solutions differs substantially from that of viscose solutions. Thus, although the particles being filtered from the solution are thought to be smaller in the case of acetate, plugging is reduced and filter efficiency maintained at a high level if the initial filter zone has a surface pore size substantially larger than the optimum pore size used in filtering viscose solutions.

Although the filters of this invention can be used to filter any of these highly viscous polymeric materials of the types generally used in making synthetic fibers, films and the like, they are particularly advantageous in and primarily designed for the filtration of high polymeric materials dissolved in nonaqueous solvents, especially highly viscous cellulosic esters. Accordingly, the invention will be described with particular reference to the filtration of cellulosic ester solutions, and especially those such as are used for the spinning of cellulose acetate filaments. These particular references to the filtration of cellulose acetate solutions are included only for the purpose of illustrating the primary usefulness of invention and should not be construed as limitive of the broader aspects thereof.

In order to more clearly describe the present invention, reference is made to the drawings in which.

SPECIFIC EMBODIMENTS OF THE INVENTION

Figure 1:
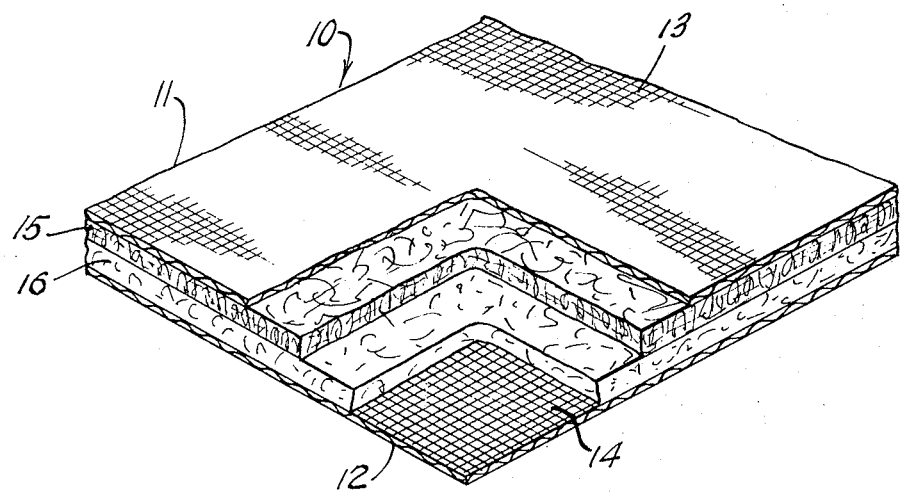
FIG. 1 is an illustration of a filter media with portions broken away to show the different filter elements.

Referring to FIG. 1, the first stage filter media, 10, contains on its inlet side, 11, and on its outlet side, 12, outer protective coverings, designated respectively as 13 and 14. Outer protective covering 13 is formed of open mesh gauze of about 14 x 10 thread count. The outer protective covering 14 may be formed of similar gauze or of a somewhat more closely woven fabric material. The coverings, 13 and 14, serve primarily to facilitate removal of the encrusted filter from the filter press. On the inlet side, next to the protective gauze covering, 13, is an initial filter zone or filter layer, 15, having a surface pore size well above 1,000 microns and formed of springy, relatively rigid 40 denier viscose rayon fibers, which will not become limp when wetted by cellulose acetate solutions, at a bed weight of 8 ounces per square yard. This zone, 15, is followed by a filter zone 16 of substantially smaller pore size formed of 5.0 micrograms per linear inch cotton linters at a bed weight of 36 ounces per square yard.

Figure 2:
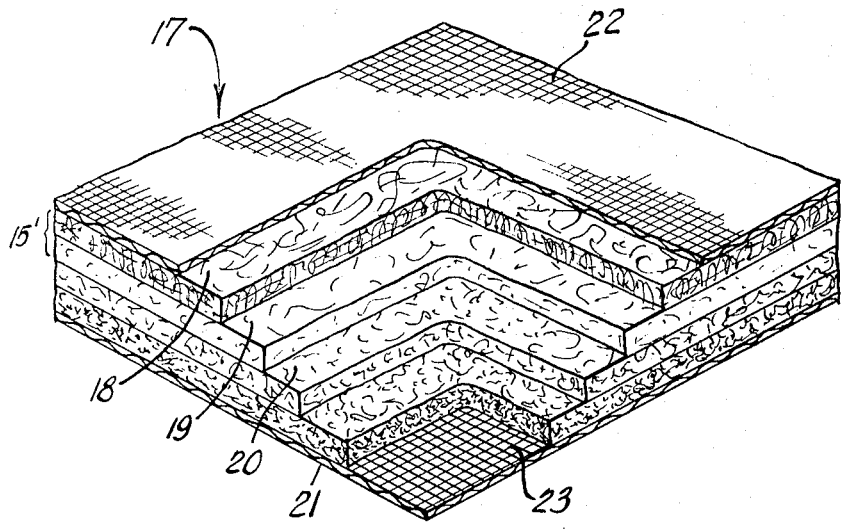
FIG. 2 is a somewhat different construction of a filter media made in accordance with the present invention also having a multiplicity of layers of relatively fine pore size.

In a similar manner, the filter media, 17, of FIG. 2 contains an outer covering, 22, on its inlet side covering incoming filter layer 15' and an outer covering, 23, on its outlet side covering filter layer 21, the outer coverings being formed of the same materials as the coverings 13 and 14 of the filter media, 10, of FIG. 1.

The initial filter zone, 15', of the filter media, 17, of FIG. 2 consists of an outer layer, 18, having a bed weight of 4.0 ounces per square yard and formed of the same fibers as zone 15 of the filter, 10, illustrated in FIG. 1. The initial filter zone, 15', additionally consists of inner layer 19 having a bed weight of 1.5 ounces per square yard and being formed of 15 denier rayon fibers. The properties and characteristics of the following individual filter zones, 20 and 21, is adjusted so that each in turn separates out successively smaller particles, these layers being similar to the successive layers as, for example, described in Thomas Patent No. 3,003,643. Thus, the second filter zone, 20, of the combination comprises fibers having an average fineness equivalent to a weight of about 5.5 micrograms per linear inch for a material having a density of cellulose (Micronaire Method) at a bed weight of 1750 grains per square yard. This provides a maximum pore size of about 120 microns. This combination of maximum pore diameter, fiber bed weight, and fiber fineness cooperates to enable the second filtering zone to carry out its major function of separating out the large particles which have not been separated out by the incoming filter bone 15', while permitting the smaller particles to pass therethrough.

The third filtering zone, 21, is formed of about 9,000 grams per square yard of cotton linters to thus provide a maximum pore size of about 55 microns. Thus, the layer is denser than the preceding two layers and therefore filters out the extremely small particles which are not separated out by the preceding filtering layers. This separation is the finest of all the filtrations accomplished by the filter media 17 of FIG. 2.

COMPONENTS OF THE MEDIA OF THIS INVENTION

A. Initial zone

The initial filter zone, which is on the inlet side of the filter media, should have at least a 1.0 ounce per square yard surface portion formed of a reltaively resilient, springy fiber having a denier of no less than about 25 and preferably of from about 35 or 40 to about 60. This provides an initial filter zone having a surface pore size well in excess of 1,000 microns and provides the initial filter zone with substantial mechanical rigidity.

To be most effective in prolonging filter life, the layer of the initial filter zone formed of these fibers should have a bed weight of at least about 2 ounces per square yard and preferably at least about 4 ounces per square yard. The best results are obtained when the bed weight of this layer exceeds 8 ounces per square yard. Alternatively, when the bed weight of this layer of very large denier fibers is much less than about 8 ounces per square yard, a substantially equal improvement in filter life may be obtained, if the incoming filter zone is provided with a second layer inward of the surface layer having a bed weight of from about one ounce per square yard to about 3 ounces per square yard and consisting of fibers having a denier of from about 5 to about 24 and therefore having a maximum pore size of from about 500 to about 1,000 microns. As the weight of the surface layer of very large denier fibers increases, the weight of the second layer may be decreased or the denier of the fibers in the second layer may be decreased.

Although from a standpoint of cost, at the present time, viscose rayon fibers are highly satisfactory for practicing the present invention in forming the springy fiber layer, the invention is not limited thereto, and other fibers which do not swell are also suitable for forming said layer.

As previously indicated, it is preferred from the standpoint of improved filter life that the incoming filter zone maintain its open construction and resilient nature and that the fibers forming the same do not soften and collapse under the high operating pressures encountered during the filtering operation. It is found that the rigidity of the fiber structure and its resistance to collapse can be even further improved by bonding fibers in the initial filter zone at points of crossing with a suitable binder resistant to the solution to be filtered. This may be done by spraying the fiber web with a solution of the binder or by immersing the web in the binder resin and then removing the excess fluid and drying. Suitable resin binders for bonding crossing fibers where the filter media is to be used for filtering acetate solutions include polyvinyl alcohol and crosslinked acrylic latex.

B. Subsequent filter zones

As previously pointed out, the pore size and fiber fineness decreases in each successive filter zone. In a filter media of the type illustrated in FIG. 2, the maximum pore diameter of this second zone, 20, suitably ranges from about 70 to about 160 microns and preferably, about 80 to about 140 microns, and the weight of the second filter zone, 20, suitably ranges from about 875 to about 3,500 grains per square yard and preferably from about 1,300 to about 2,500 grains per square yard. The third filter zone has a lower maximum pore diameter than the preceding layers, the pore size suitably being in the range of from about 45 to about 60 microns and preferably from about 50 to about 58 microns. One material particularly suitable for use as the third filter zone, 21, of a filter of the type of FIG. 2 is a layer of wet-formed cotton linter pulp having a bed weight of from about 4,000 to about 5,300 grains per square yard. This weight and density cooperate in the wet forming process to yield the desired maximum pore diameter and filtering characteristics.

ADVANTAGES OF THE MEDIA OF THIS INVENTION

The invention and the advantages derived from the use thereof is further illustrated in greater detail by the following example and data. It should be understood, however, that though this example describes the use of a particular fiber in the initial resilient fiber filter layer, it is given primarily for the purpose of illustration and the invention in its broader aspects is not to be construed as limited thereto.

A filter media is prepared as follows: The incoming layer is formed of 14 x 10 gauze upon which is deposited and bonded thereto approximately 2.0 ounces per square yard of India cotton having a fineness of 7.0 micrograms per linear inch. A second filtering layer is prepared comprising fibers layed to a weight of 1.0 ounce per square yard, the fibers being cotton shoddy having a fineness of approximately 5.5 micrograms per linear inch. A third filter layer is formed of comber cotton at a fiber weight of 3.0 ounces per square yard, the fibers having a fineness of about 3.5 micrograms per linear inch. The fourth filter zone is a 5.3 ounce per square yard web of sakel cotton having a fineness of 2.8 micrograms per linear inch. There is then added a layer of outgoing gauze to give the assembly strength. This filter media is made essentially in accordance with the teachings of Thomas Patent 3,003,643.

The life of this filter media is measured with a cellulose acetate solution by passing the solutions through the filter until a pressure of 250 p.s.i. is reached. Once a pressure of 250 p.s.i. is required to pass the solution through the filter, the same is considered to have failed and to have outlived its usefulness. The filter life is measured in terms of gallons per square foot passing through the filter up to the point of failure. The filter media described above has a filter life of about 36.0 gallons per square foot.

A second filter media is prepared which is identical to the first media except that a web of 1.6 ounces per square yard of 15.0 denier rayon fibers is added on the inlet side of the first filter media inward of the gauze covering, thus following the teachings of Mesek Patent 3,276,597. The filtration test is carried out as described above and the filter life is 38.7 gallons per square foot.

A third media is provided which is identical with the second media except that a 4.0 ounce per square yard web of 40 denier rayon fibers is added on the inlet side of the filter inward of the gauze covering in accordance with this invention. When measured as described above, the life of the filter in found to be 78 gallons per square foot. The tests are repeated with first a 2.0 ounce per square yard and then a 1.0 ounce per square yard incoming layer of 40 denier rayon fibers and comparable results are obtained.

In preparing still another filter media in accordance with this invention, the weight of the incoming layer of 40 denier fibers is increased to 8 ounces per square yard and the layer of 15 denier rayon fibers eliminated. The filter life is found to be comparable to that of the third filter media described above.

Thus in the practice of this invention, a filter life of from about over 2 times that of filters prepared according to either the Thomas patent or the Mesek patent when used in cellulose acetate filtration is obtained.

Figure 3:
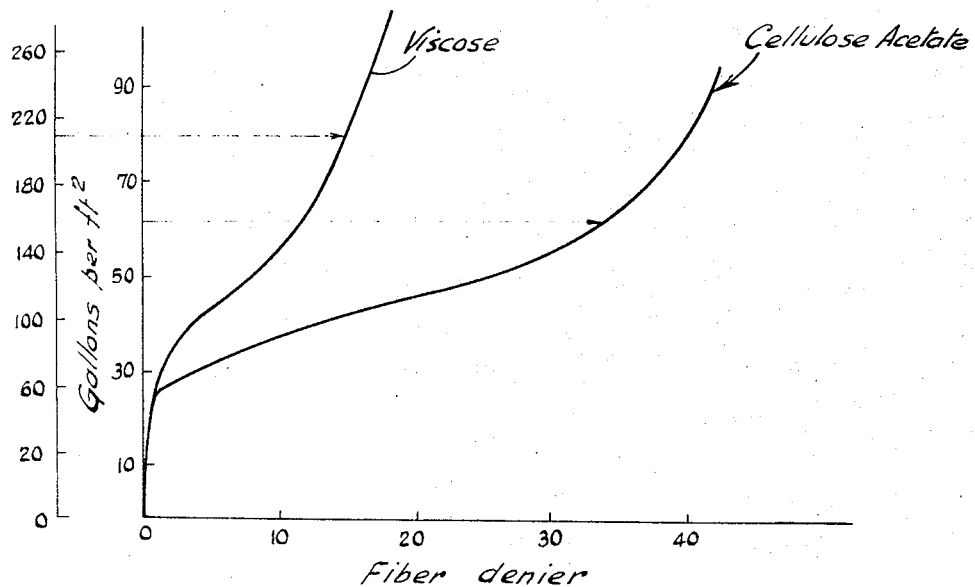
FIG. 3 is a typical graph of initial filter zone life v. fiber denier for both viscose solutions and cellulose acetate solutions.

As previously pointed out, filter failure in the filtration of high polymeric solutions appears to result from plugging of the initial filter layer. A series of 4.0 ounce per square yard webs of Dynel fibers of varying deniers are prepared and tested for filter life in viscose filtration. It is found, as disclosed by Mesek Patent 3,276,597, that when fibers having a denier of greater than about 5 are used, incoming filter zone life is greatly increased, a typical curve being shown in FIG. 3 of the drawings. A series of 4.0 ounce per square yard webs of viscose rayon fibers are prepared and utilized in cellulose acetate filtration. As can be seen from the curve of FIG. 3, there is little difference in initial zone filter life in cellulose acetate filtration when 15 denier fibers as opposed to 3 denier fibers are used. However, a substantial improvement is noted when fibers having a denier of 25 or 30 or more are used.

What is claimed is:
1. A fibrous filter media for use in the filtration of solutions of high polymeric materials especially cellulose esters preparatory to the conversion of said solutions into filaments, film and the like comprising:
  an incoming filter zone of relatively large pore size, consisting mostly of a bed of relatively stiff, resilient, synthetic fibers which retain their rigidity during filtration and are inert to the filtration solution, said first filter zone having:
    (a) on its inlet side an inlet layer of fibers having a bed weight of at least about 1.0 ounce per square yard, said layer consisting essentially of fibers having an average denier of from about 25 to about 60 and having a maximum surface pore size of well above 1,000 microns, and
    (b) where said inlet layer is much less than about 8 ounces per square yard, a layer of fibers following said inlet layer having a bed weight of at least about 1.0 ounce per square yard consisting essentially of fibers having an average denier of from about 5 to about 24 and having a pore size of between about 500 and about 1,000 microns,
  followed by a second filter zone of substantially smaller pore size formed of highly flexible readily compressible fibers having an average denier substantially smaller than the denier of the fibers of said incoming filter zone.

2. A filter media of claim 1 in which the average denier of the fibers of said first layer of said incoming filter zone is within the range of about 35 to 55.

3. A filter media of claim 1 in which the fibers of said incoming filter zone have an average denier of at least 40.

4. A filter media of claim 1 in which the fibers of said incoming filter zone are viscose rayon fibers.

5. A filter media of claim 3 in which the filter zone of substantially smaller pore size is formed of a plurality of filter layers of progressively decreasing pore size moving from the inlet side of the filter towards the outlet side thereof.

6. A filter media of claim 3 in which the rigidity of the fibers of said incoming filter zone is increased by bonding adjacent fibers at numerous points of fiber intersection throughout said filter zone.

References Cited

UNITED STATES PATENTS

| | | | |
|---|---|---|---|
| 2,551,175 | 5/1951 | Smith | 210—489 |
| 2,774,127 | 12/1956 | Secrist. | |
| 2,820,985 | 1/1958 | Cresswell | 210—489 X |
| 2,869,176 | 1/1959 | Wright. | |
| 3,003,643 | 10/1961 | Thomas | 210—491 |

REUBEN FRIEDMAN, *Primary Examiner.*

J. ADEE, *Assistant Examiner.*

210—505